(12) United States Patent
Silverbrook

(10) Patent No.: US 7,878,627 B2
(45) Date of Patent: Feb. 1, 2011

(54) PRINTHEAD ASSEMBLY HAVING PRINTHEAD RECESSED IN CHANNEL BODY

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 76 days.

(21) Appl. No.: 12/435,372

(22) Filed: May 4, 2009

(65) Prior Publication Data

US 2009/0213175 A1 Aug. 27, 2009

Related U.S. Application Data

(63) Continuation of application No. 11/075,918, filed on Mar. 10, 2005, now Pat. No. 7,543,924, which is a continuation of application No. 09/922,105, filed on Aug. 6, 2001, now Pat. No. 6,918,654, which is a continuation-in-part of application No. 09/113,053, filed on Jul. 10, 1998, now Pat. No. 6,362,868.

(30) Foreign Application Priority Data

Jul. 15, 1997 (AU) ..................... PO7979
Jul. 15, 1997 (AU) ..................... PO7991

(51) Int. Cl.
 *B41J 2/155* (2006.01)
 *B41J 2/14* (2006.01)
 *B41J 2/16* (2006.01)
 *B41J 2/05* (2006.01)
 *B41J 2/175* (2006.01)

(52) U.S. Cl. ............................. 347/42; 347/65; 347/49; 347/85

(58) Field of Classification Search ................... 347/42, 347/49, 65, 85
See application file for complete search history.

(56) References Cited

U.S. PATENT DOCUMENTS

| 4,000,239 A | 12/1976 | Hamana et al. |
| 4,253,476 A | 3/1981 | Sato |
| 4,333,088 A | 6/1982 | Diggins |
| 4,488,563 A | 12/1984 | Morifuji et al. |
| 4,534,142 A | 8/1985 | Drefahl |
| 4,683,481 A | 7/1987 | Johnson |
| 4,819,395 A | 4/1989 | Sugita et al. |
| 4,868,676 A | 9/1989 | Matsuura et al. |
| 4,914,452 A | 4/1990 | Fukawa |
| 4,937,676 A | 6/1990 | Finelli et al. |
| 4,987,030 A | 1/1991 | Saito et al. |

(Continued)

FOREIGN PATENT DOCUMENTS

EP 0382044 A2 8/1990

(Continued)

*Primary Examiner*—Julian D Huffman

(57) ABSTRACT

The present invention relates to a printhead assembly. The printhead assembly comprises an ink supply module for supplying at least one ink. There is also provided a body defining at least one ink channel. In use, the body interfaces with the ink supply module so that a respective ink is supplied from the ink supply module to a corresponding channel. The printhead assembly also comprises a printhead which, in turn, comprises at least one set of ink inlets. In use, the printhead interfaces with the body so that a respective ink is supplied from a respective channel to a corresponding set of ink inlets. A printing device comprising the printhead assembly is also provided.

4 Claims, 8 Drawing Sheets

U.S. PATENT DOCUMENTS

| | | | |
|---|---|---|---|
| 5,077,565 A | 12/1991 | Shibaike et al. |
| 5,132,707 A | 7/1992 | O'Neill |
| 5,208,610 A | 5/1993 | Su et al. |
| 5,367,324 A | 11/1994 | Abe et al. |
| 5,398,131 A | 3/1995 | Hall et al. |
| 5,467,118 A | 11/1995 | Gragg et al. |
| 5,489,930 A | 2/1996 | Anderson et al. |
| 5,565,900 A | 10/1996 | Cowger et al. |
| 5,613,175 A | 3/1997 | Frankel |
| 5,646,658 A | 7/1997 | Thiel et al. |
| 5,679,456 A | 10/1997 | Sakai et al. |
| 5,764,258 A | 6/1998 | Hetzer et al. |
| 5,792,249 A | 8/1998 | Shirota et al. |
| 5,824,410 A | 10/1998 | Sakai et al. |
| 5,825,882 A | 10/1998 | Kowalski et al. |
| 5,847,836 A | 12/1998 | Suzuki |
| 5,850,234 A | 12/1998 | Kneezel et al. |
| 5,866,253 A | 2/1999 | Philipps et al. |
| 5,949,467 A | 9/1999 | Gunther et al. |
| 5,992,994 A | 11/1999 | Rasmussen et al. |
| 5,995,772 A | 11/1999 | Barry et al. |
| 6,084,713 A | 7/2000 | Rosenthal |
| 6,188,414 B1 | 2/2001 | Wong et al. |
| 6,217,165 B1 | 4/2001 | Silverbrook |
| 6,290,334 B1 | 9/2001 | Ishinaga et al. |
| 6,318,849 B1 | 11/2001 | Silverbrook |
| 6,472,052 B1 | 10/2002 | Silverbrook |
| 6,543,880 B1 | 4/2003 | Akhavain et al. |
| 6,773,874 B2 | 8/2004 | Silverbrook |
| 6,913,875 B2 | 7/2005 | Silverbrook |
| 7,063,940 B2 | 6/2006 | Silverbrook |
| 7,186,499 B2 | 3/2007 | Silverbrook |
| 7,291,447 B2 | 11/2007 | Silverbrook |

FOREIGN PATENT DOCUMENTS

| | | |
|---|---|---|
| EP | 0398295 A2 | 11/1990 |
| EP | 0763930 A1 | 3/1997 |
| JP | 06-149051 | 5/1994 |
| JP | 09-071015 | 3/1997 |
| JP | 09-116843 | 5/1997 |
| JP | 09-187040 | 7/1997 |
| WO | WO 95/16323 | 6/1995 |
| WO | WO 96/32265 A | 10/1996 |
| WO | WO 97/06958 A | 2/1997 |
| WO | WO 01/42026 A1 | 6/2001 |

PRINTHEAD ASSEMBLY HAVING PRINTHEAD RECESSED IN CHANNEL BODY

CROSS REFERENCES TO RELATED APPLICATIONS

The present application is a continuation of U.S. application Ser. No. 11/075,918 filed Mar. 10, 2008, which is a continuation of U.S. application Ser. No. 09/922,105 filed on Aug. 6, 2001, now issued U.S. Pat. No. 6,918,654, which is a continuation-in-part application of U.S. application Ser. No. 09/113,053 filed on Jul. 10, 1998, now issued U.S. Pat. No. 6,362,868 the entire contents of which are hereby incorporated by reference.

REFERENCES TO US APPLICATIONS

U.S. Pat. Nos. 6,362,868, 6,350,023 and U.S. patent applications Ser. No. 09/113,101, now abandoned,

FIELD OF THE INVENTION

This invention relates to ink jet printheads. More particularly, this invention relates to an ink jet printhead that incorporates through-chip ink ejection nozzle arrangements.

BACKGROUND TO THE INVENTION

The Applicant has invented an ink jet printhead that is capable of generating text and images at a resolution of up to 1600 dpi.

In order to achieve this, the Applicant has made extensive use of micro electro-mechanical systems technology. In particular, the Applicant has developed integrated circuit fabrication techniques suitable for the manufacture of such printheads. The Applicant has filed a large number of patent applications in this field, many of which have now been allowed.

The printheads developed by the Applicant can include up to 84000 nozzle arrangements. Each nozzle arrangement has at least one moving component that serves to eject ink from a nozzle chamber. The components usually either act directly on the ink or act on a closure which serves to permit or inhibit the ejection of ink from the nozzle chamber.

The moving components within the printheads are microscopically dimensioned. This is necessary, given the large number of nozzle arrangements per printhead. The Applicant has spent a substantial amount of time and effort developing configurations for such printheads.

One of the reasons for this is that, as is known in the field of integrated circuit fabrication, cost of on-chip real estate is extremely high. Furthermore, it is important that levels of complexity are kept to a minimum since these significantly increase the cost of fabrication.

As a result of the need to keep on-chip real estate to a minimum, the Applicant has developed printhead chips that are extremely thin, having a high length to width ratio. These chips are positioned end-to-end to span a medium on which ink is to be deposited.

A substantial difficulty to be overcome with such printheads is the supply of ink to the nozzle arrangements. A possibility investigated by the Applicant was the provision of ink passages extending the length of the printhead chips, each passage carrying a different color. However, it will be appreciated by those of ordinary skill in the field of fluid mechanics that ink driven through such passages would be subject to an extremely high pressure drop. This pressure drop inhibits the ink from being carried at a suitably high flow rate. In FIG. 1 of the drawings, there is shown a printhead chip 1 incorporating three passages 2, one for each color, extending the length of the printhead chip. The problem associated with pressure drop in the passages is immediately apparent to a person of ordinary skill in the field of fluid mechanics, given the small cross sectional area of these passages.

An important requirement for the nozzle arrangements of this form of printhead is that they be refilled quickly once ink has been ejected from the nozzle chambers. This ensures that the nozzle arrangements can re-fire in a very short time, leading to rapid printing, which is an advantage sought by the Applicant. The high pressure drop mentioned in the previous paragraph inhibits the development of a suitable flow rate to the nozzle chambers and consequent rapid re-firing.

In order to address this issue, one example of a printhead chip has rows of ink inlet openings defined therein into which ink is fed. Each row of ink inlet openings corresponds to a differently colored ink. Thus, the necessity of having ink flowing lengthwise in each chip is obviated.

For color printing, at least three different inks must be provided to the printhead chip. These are Cyan, Magenta and Yellow inks. It is critical that these inks are kept separate from each other up to the point of impact on the print medium since the printhead chip prints a dithered image. It follows that it is necessary to provide each inlet opening with an ink of a different color. This is shown schematically in FIG. 2. As can be seen in FIG. 2, this can be achieved by providing a primary channel or reservoir 3 for each color. The ink from each reservoir 3 is fed into smaller channels 4, which in turn feed into the rows of ink inlet openings in a printhead chip 5.

It is to be appreciated that an ink distribution assembly comprising the reservoirs 3 and the smaller channels 4 must be manufactured with a high degree of accuracy due to the small size of the channels in the printhead chip 5 and the necessity for consistent ink flow to the openings in the printhead chip 5.

One way of achieving this accuracy would be to machine the assembly out of silicon. However, Applicant has found that this would result in a product that is far too costly to be commercially competitive.

It follows that the assembly should preferably be molded of a plastics material. The principle forms of molding plastics material are extrusion molding and injection molding. Applicant has found that extrusion molding is not capable of producing a product that has the required accuracy and structural stability for the assembly in question.

Substantial advances have been made in injection molding over the past years. Applicant has found that this form of molding can provide an assembly with the required accuracy and stability of construction. However, Applicant has identified a difficulty in injection molding an assembly having more than two reservoirs for ink. This is associated with the fact that it would appear that such a structure would require the construction of side mover cores when fabricating the molds to be used in the injection molding process. These cores are generally complex and expensive to manufacture. In FIG. 3, there is shown what would be an intuitive assembly including three ink reservoirs 6 molded in a plastics material, one for each ink of a particular color. It is clear that injection molding such an assembly would require the use of side mover cores.

The Applicant has thus developed a distribution assembly that obviates the need for such side mover cores in its fabrication.

SUMMARY OF THE INVENTION

According to a first aspect of the invention, there is provided an ink distribution assembly for a page width ink jet printhead in the form of at least one printhead chip having sets of ink inlet openings, each set having at least one inlet opening for receiving an ink of a particular color to be supplied to the printhead chip, the assembly comprising a carrier having an elongate structure with a printhead side that is engageable with the printhead and an opposed ink supply side, and defining feed openings through the carrier to be in fluid communication with respective ink inlet openings of the printhead, the ink supply side of the carrier defining a number of discrete feed formations, each feed formation being configured to receive ink of a particular color and to be in fluid communication with the, or each, inlet opening of a respective set, via the feed openings, and the printhead side of the carrier defining at least one ink supply formation, the carrier defining at least one passage in fluid communication between the, or each, ink supply formation and at least one of the feed formations; and a cover that is engageable with the carrier at the ink supply side, the cover and the ink supply side of the carrier being shaped so that, when the cover is in position, the cover serves to define a roof for the feed formations and so that the cover and the ink supply side of the carrier define ink pathways that are in fluid communication with respective feed formations, one of the carrier and the cover defining ink supply openings in fluid communication with respective ink pathways.

According to a second aspect of the invention, there is provided a molded component for an ink distribution assembly for a page width ink jet printhead in the form of at least one printhead chip having sets of ink inlet openings, each set having at least one inlet opening for receiving an ink of a particular color to be supplied to the printhead chip, the molded component comprising:

a carrier having an elongate structure with a printhead side that is engageable with the printhead and an opposed ink supply side, and defining feed openings through the carrier to be in fluid communication with respective ink inlet openings of the printhead, the ink supply side of the carrier defining a number of discrete feed formations, each feed formation being configured to receive ink of a particular color and to be in fluid communication with the, or each, inlet opening of a respective set, via the feed openings, and the printhead side of the carrier defining at least one ink supply formation, the carrier defining at least one passage in fluid communication between the, or each, ink supply formation and at least one of the feed formations.

According to a third aspect of the invention, there is provided a page width printing device which comprises:

a page width ink jet printhead in the form of at least one printhead chip having sets of ink inlet openings, each set having at least one inlet opening for receiving an ink of a particular color to be supplied to the printhead chip;

a carrier having an elongate structure with a printhead side that is engageable with the printhead and an opposed ink supply side, and defining feed openings through the carrier to be in fluid communication with respective ink inlet openings of the printhead, the ink supply side of the carrier defining a number of discrete feed formations, each feed formation being configured to receive ink of a particular color and to be in fluid communication with the, or each, inlet opening of a respective set, via the feed openings, and the printhead side of the carrier defining at least one ink supply formation, the carrier defining at least one passage in fluid communication between the, or each, ink supply formation and at least one of the feed formations; and a cover that is engageable with the carrier at the ink supply side, the cover and the ink supply side of the carrier being shaped so that, when the cover is in position, the cover serves to define a roof for the feed formations and so that the cover and the ink supply side of the carrier define ink pathways that are in fluid communication with respective feed formations, one of the carrier and the cover defining ink supply openings in fluid communication with respective ink pathways.

The invention is now described, by way of example only, with reference to the accompanying drawings. The specific nature of the following description is not to be construed as limiting the scope of this summary in any way

DETAILED DESCRIPTION OF THE DRAWINGS

Figure 1:
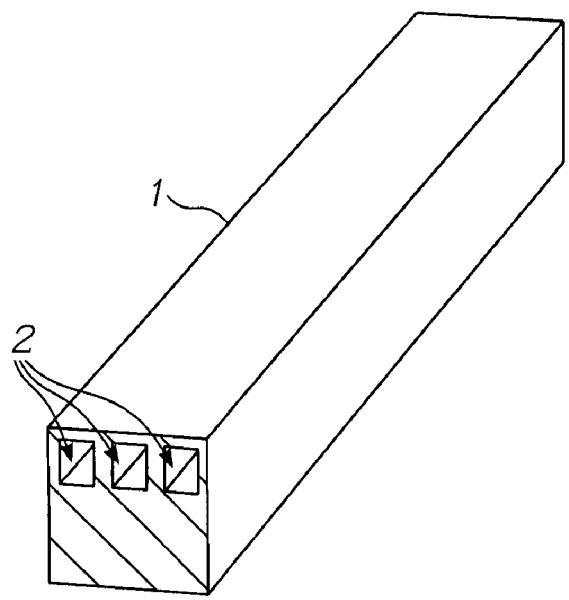
FIG. 1 shows a three dimensional view of a printhead chip incorporating ink supply passages extending a length of the chip.
Figure 2:
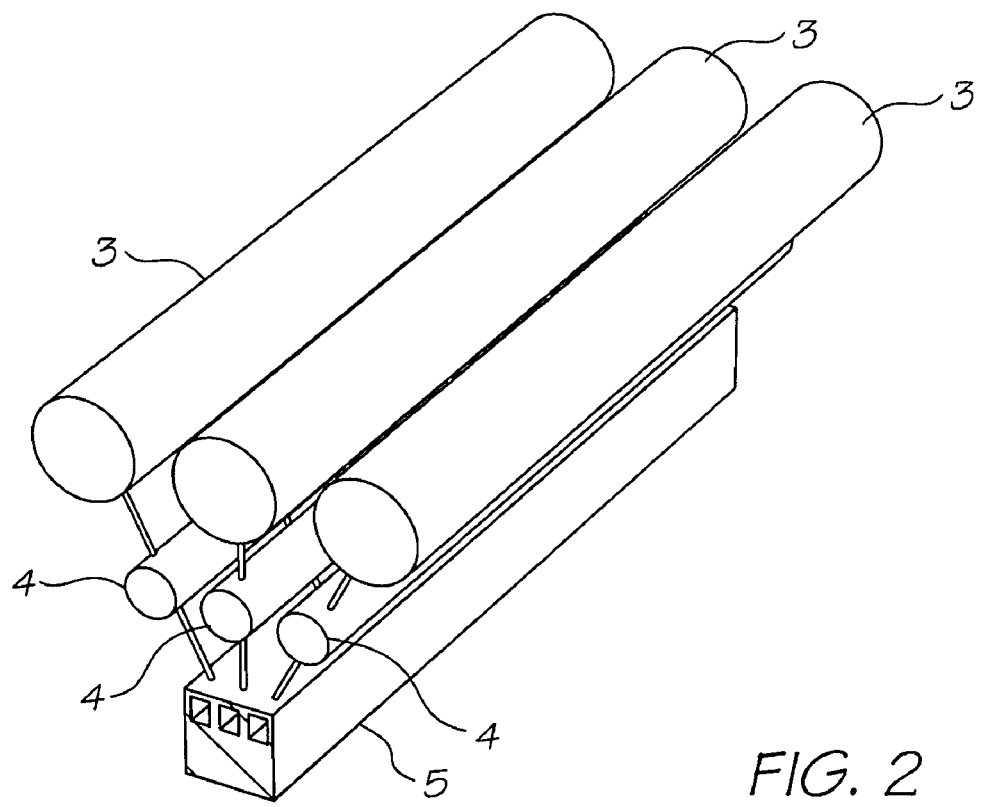
FIG. 2 shows a layout of an ink distribution assembly that addresses the problem of pressure drop within an ink jet printhead.
Figure 3:
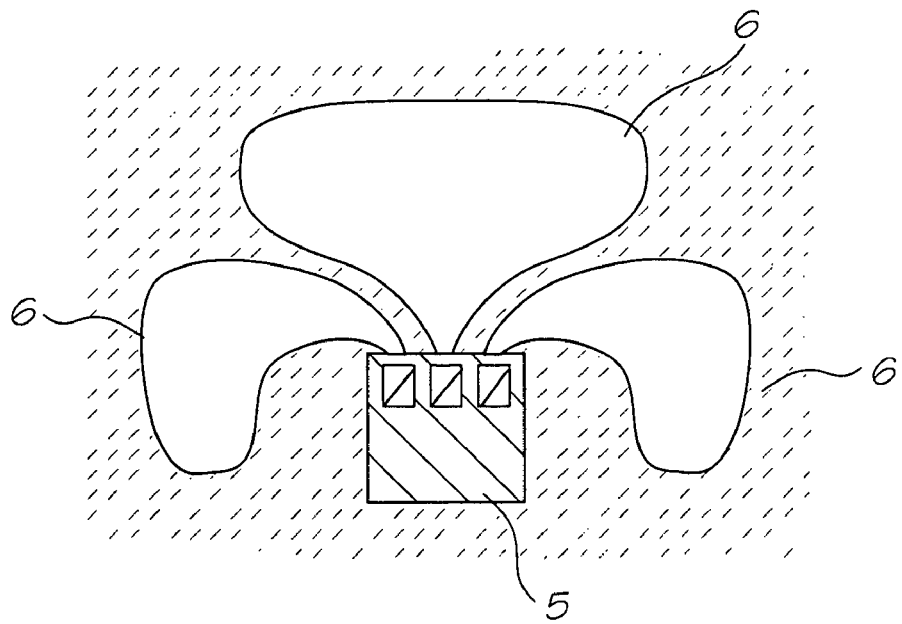
FIG. 3 shows a schematic end view of an ink distribution assembly indicating problems associated with moulding such an assembly.

In the drawings, FIGS. 1, 2 and 3 have already been discussed in the background to the invention above. These drawings indicate the provision of three separate ink reservoirs in an ink distribution assembly and, in particular, indicate the problems associated with molding such an assembly.

Figure 4:
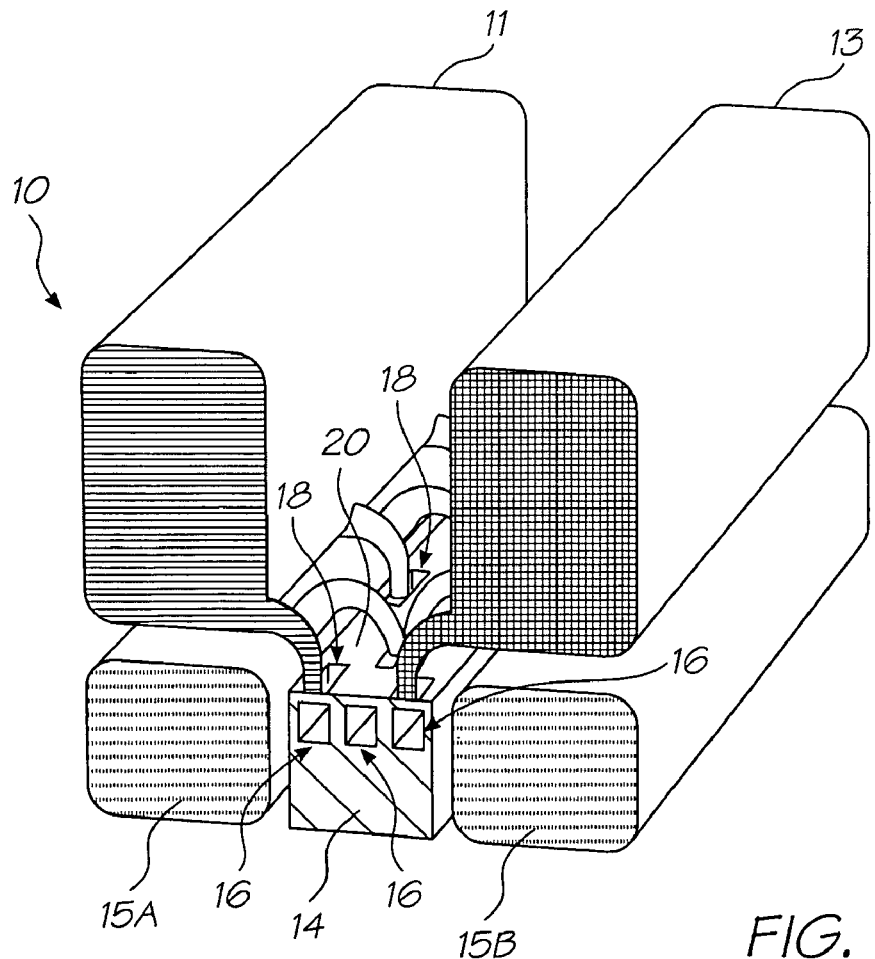
FIG. 4 shows a schematic view of an ink distribution assembly, in accordance with the invention.
Figure 5:
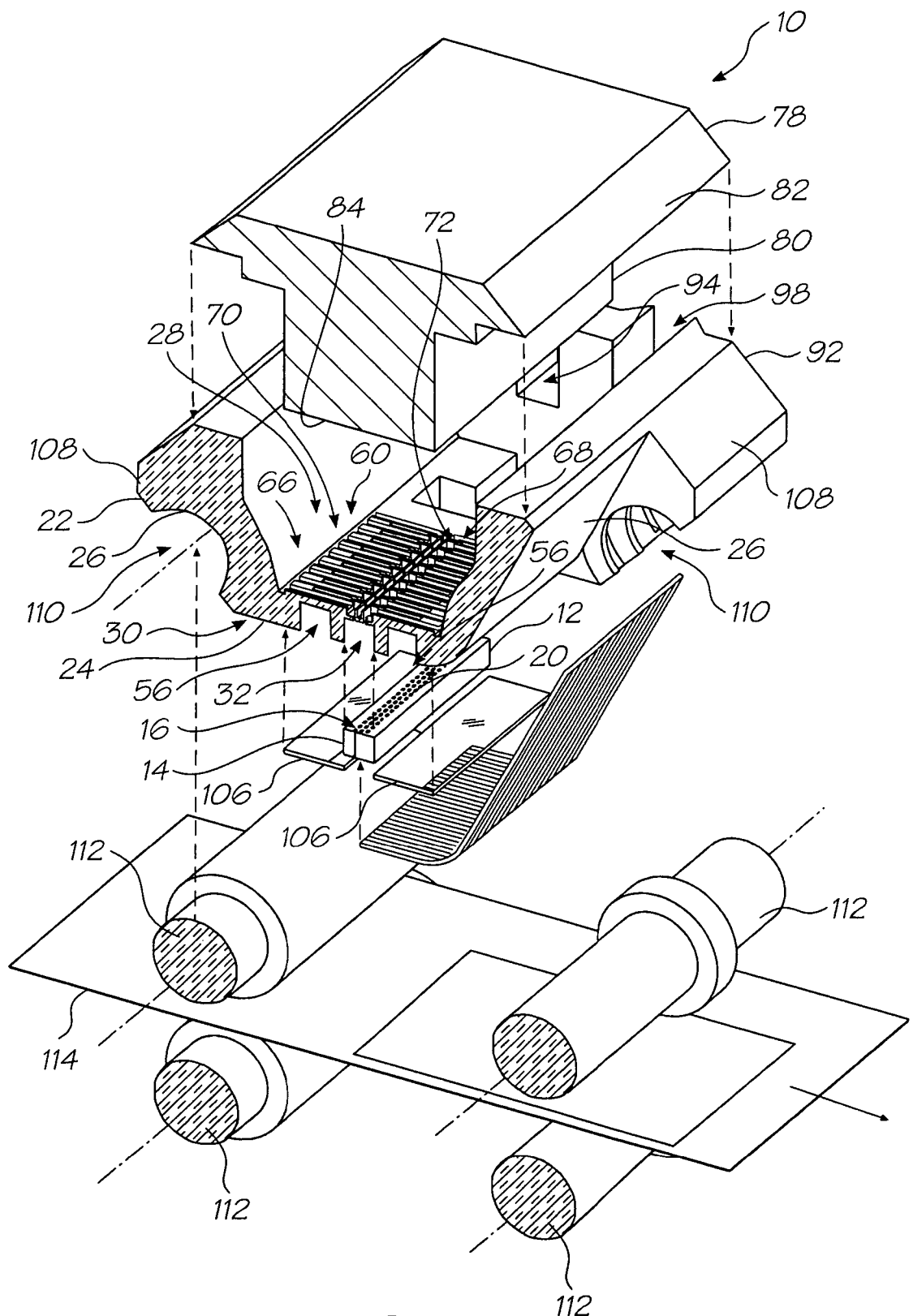
FIG. 5 shows a three dimensional, exploded view of a printing device incorporating an ink distribution assembly of the invention.
Figure 6:
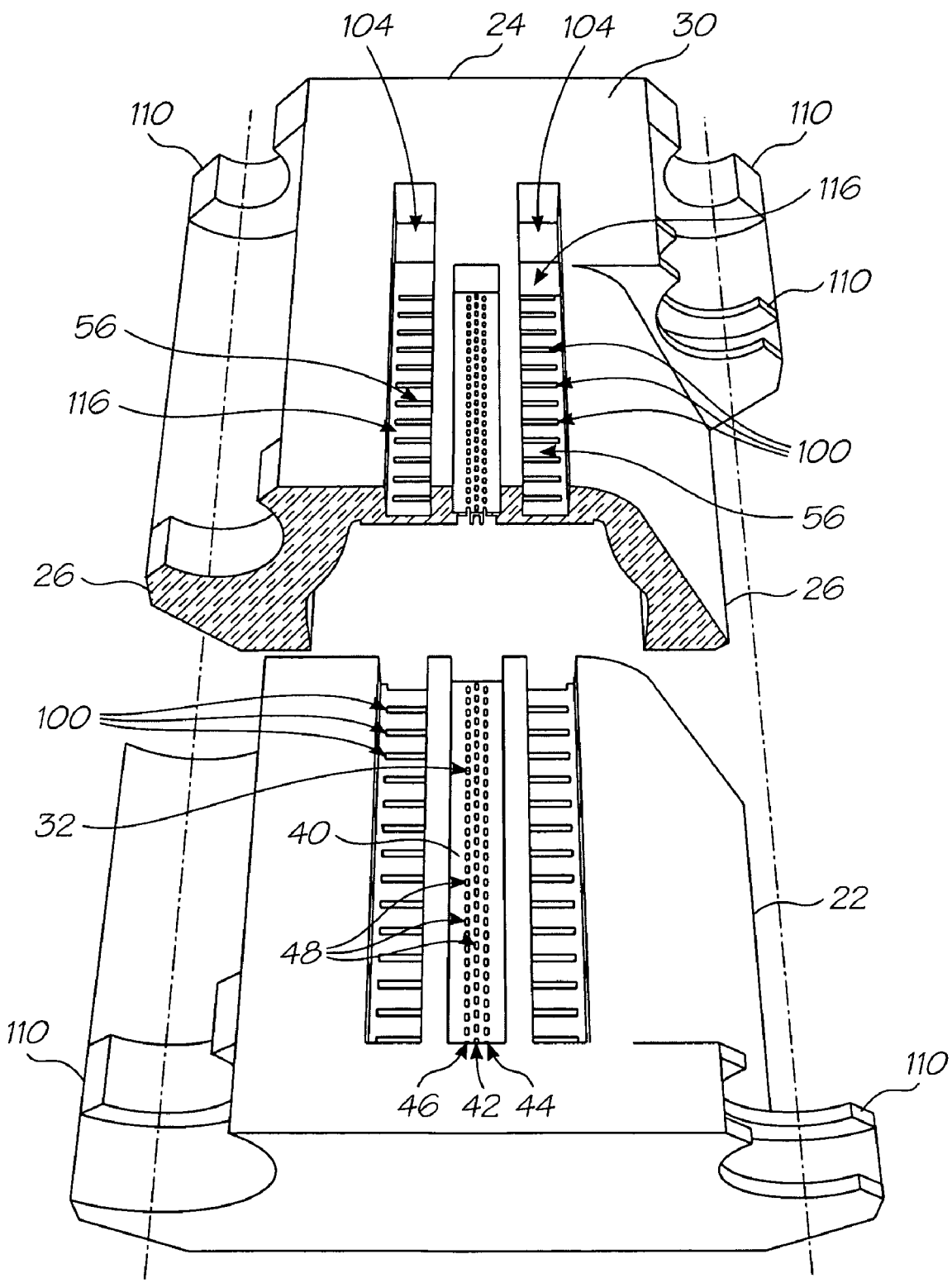
FIG. 6 shows a three dimensional view of a carrier for the ink distribution assembly, from a printhead side of the carrier.
Figure 7:
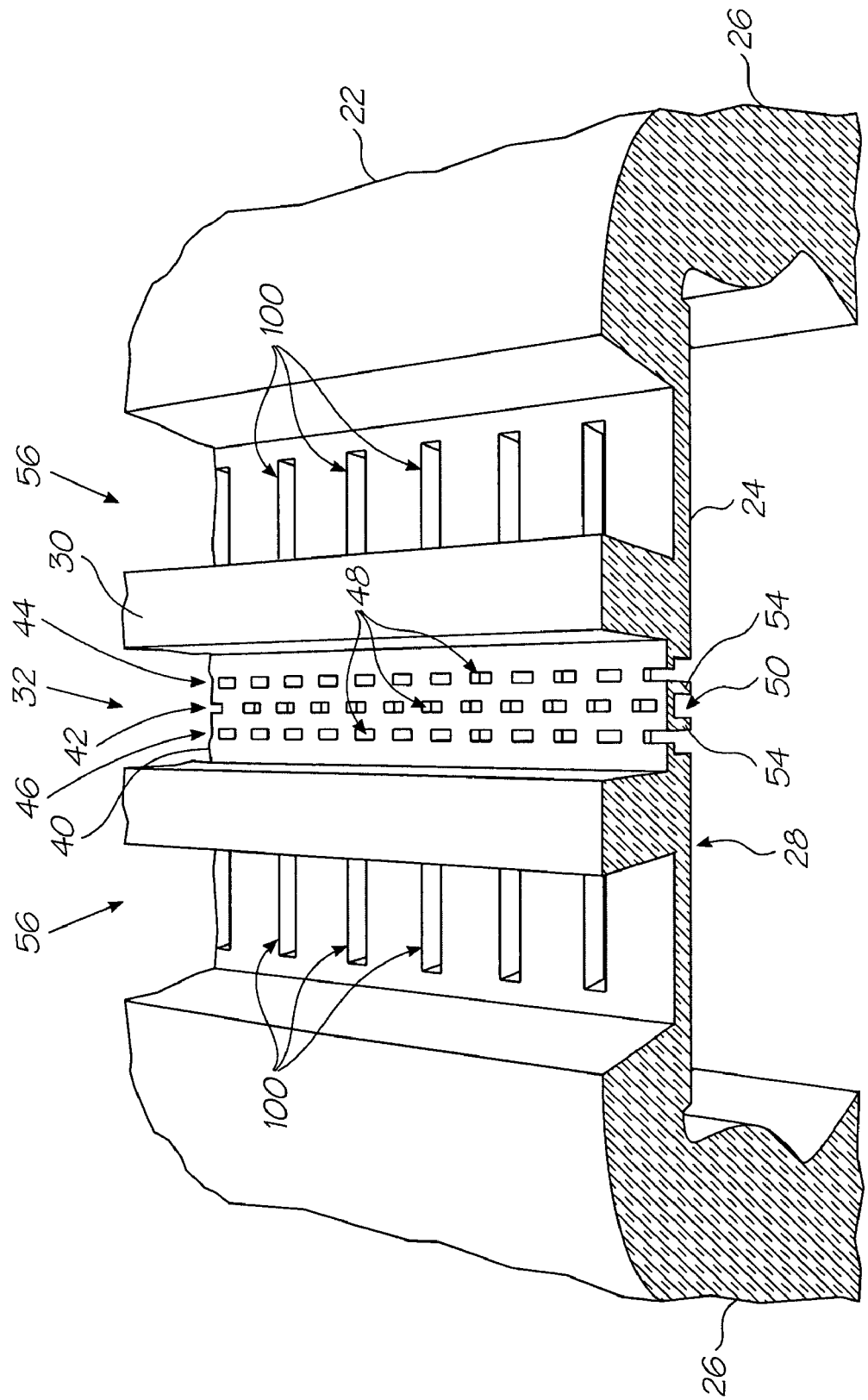
FIG. 7 shows a detailed view of the printhead side of the carrier.
Figure 8:
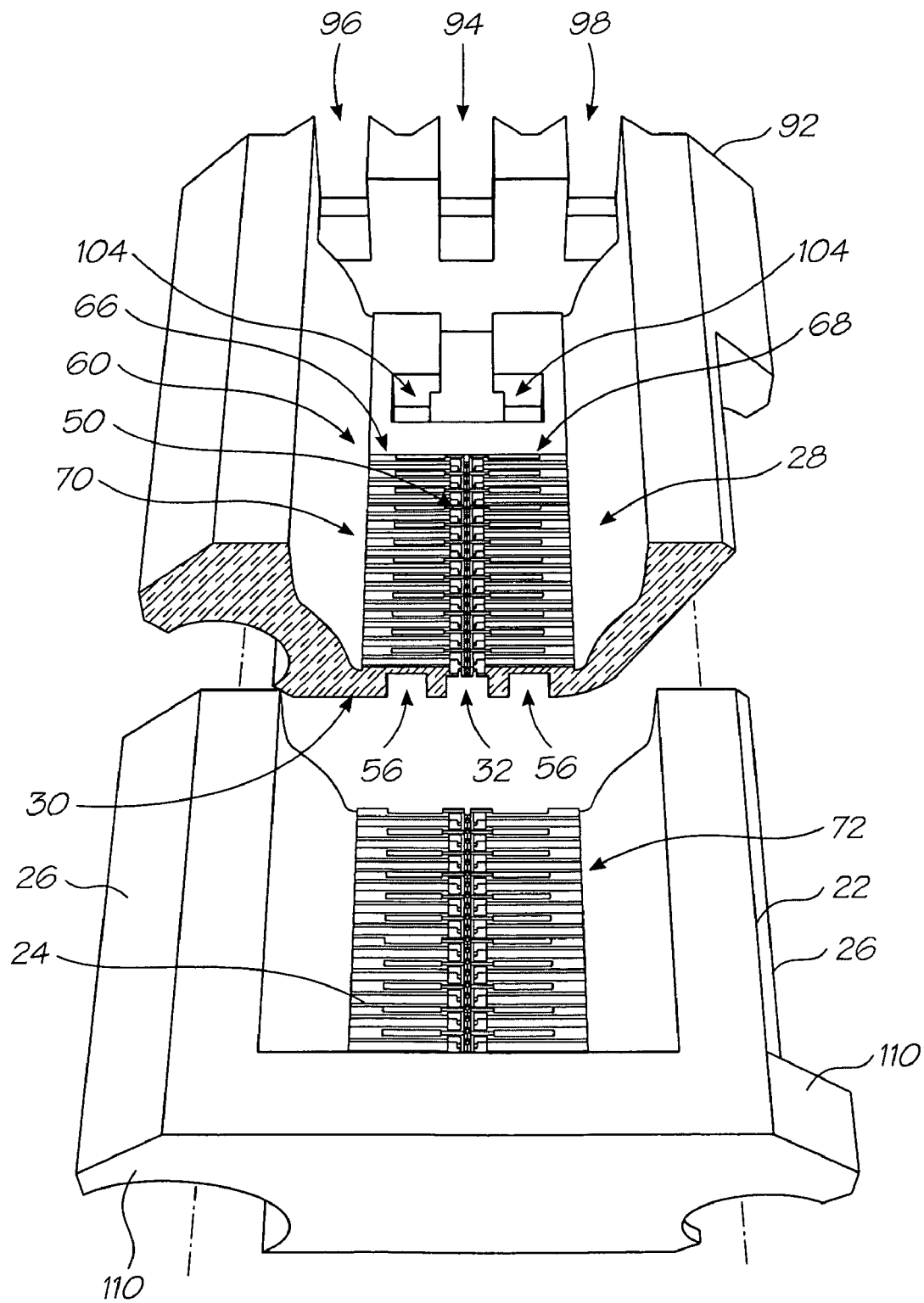
FIG. 8 shows a three dimensional view of the carrier, from an ink supply side of the carrier.

In FIGS. 4 and 5, reference numeral 10 generally indicates an ink distribution assembly, in accordance with the invention, for an ink jet printhead, indicated at 12. The printhead 12 can include one or more printhead chips 14 so that the printhead 12 defines a page width printhead.

The printhead chip 14 is the product of an integrated circuit fabrication technique. Furthermore, the printhead chip 14 incorporates a large number of nozzle arrangements, each connected to drive circuitry within the printhead chip 14. The nozzle arrangements are each in the form of a micro electromechanical device that is operable upon receipt of a signal from the drive circuitry to eject ink from the nozzle arrangement. Details of the printhead chip 14 are clearly set out in the above referenced applications. It follows that these details are not be described in this specification.

The printhead chip 14 includes three sets or rows 16 of ink inlet openings 18 which are etched into a rear side 20 of the printhead chip 14.

Each row 16 corresponds to ink of a particular color to be fed to the printhead 12. In this particular example, the printhead 12 is configured to accept cyan, magenta and yellow inks that are conventionally used for colour printing. It will readily be appreciated that this invention is applicable to those printhead chips that are configured to accept six or even more differently colored inks.

The concept behind the present invention is indicated in FIG. 4. Broadly, the Applicant has provided a supply 11 for cyan ink and a supply 13 for yellow ink above a back side of the printhead 12 and a supply 15A and 15B of magenta ink on each side of the printhead 12. This arrangement permit the distribution assembly 10 to be manufactured in a single shot injection molding process, as will become clear below.

The assembly 10 includes a carrier 22. The carrier 22 has a generally planar central portion 24 and a pair of opposed sidewall portions 26. The carrier 22 is elongate with the portions 24, 26 extending the length of the carrier 22.

The central portion 24 has an ink supply side 28 and a printhead side 30. The printhead side 30 defines a retaining formation in the form of a recess 32. The recess 32 is dimensioned so that the printhead 12 is a snug fit within the recess 32.

The rows 16 of ink inlet openings 18 in the printhead chip 14 are referred to in this specification as a central magenta row 34, an outer cyan row 36 and an outer yellow row 38 of inlet openings 18. The reference to the particular colors is simply for purposes of convenience and ease of description. It will readily be appreciated that they can be interchanged depending on the configuration of the printhead chip 14.

A floor 40 of the recess 32 defined by the carrier 22 has three rows 42, 44, 46 of ink feed openings 48 defined therein. For the purposes of this description, the row 42 will be referred to as the magenta row, the row 44 will be referred to as the cyan row and the row 46 will be referred to as the yellow row. Again, it will be appreciated that this is simply for the purposes of illustration and ease of description.

The ink feed openings 48 are positioned so that, when the printhead 12 is received in the recess 32, each ink feed opening 48 in the magenta row 42 is in register with a corresponding opening 18 in the magenta row 34 of the printhead 12. The same applies to the cyan row 44 and the yellow row 46 of ink feed openings 48 with respect to the cyan row 36 and yellow row 38 of ink inlet openings 18.

Figure 9:
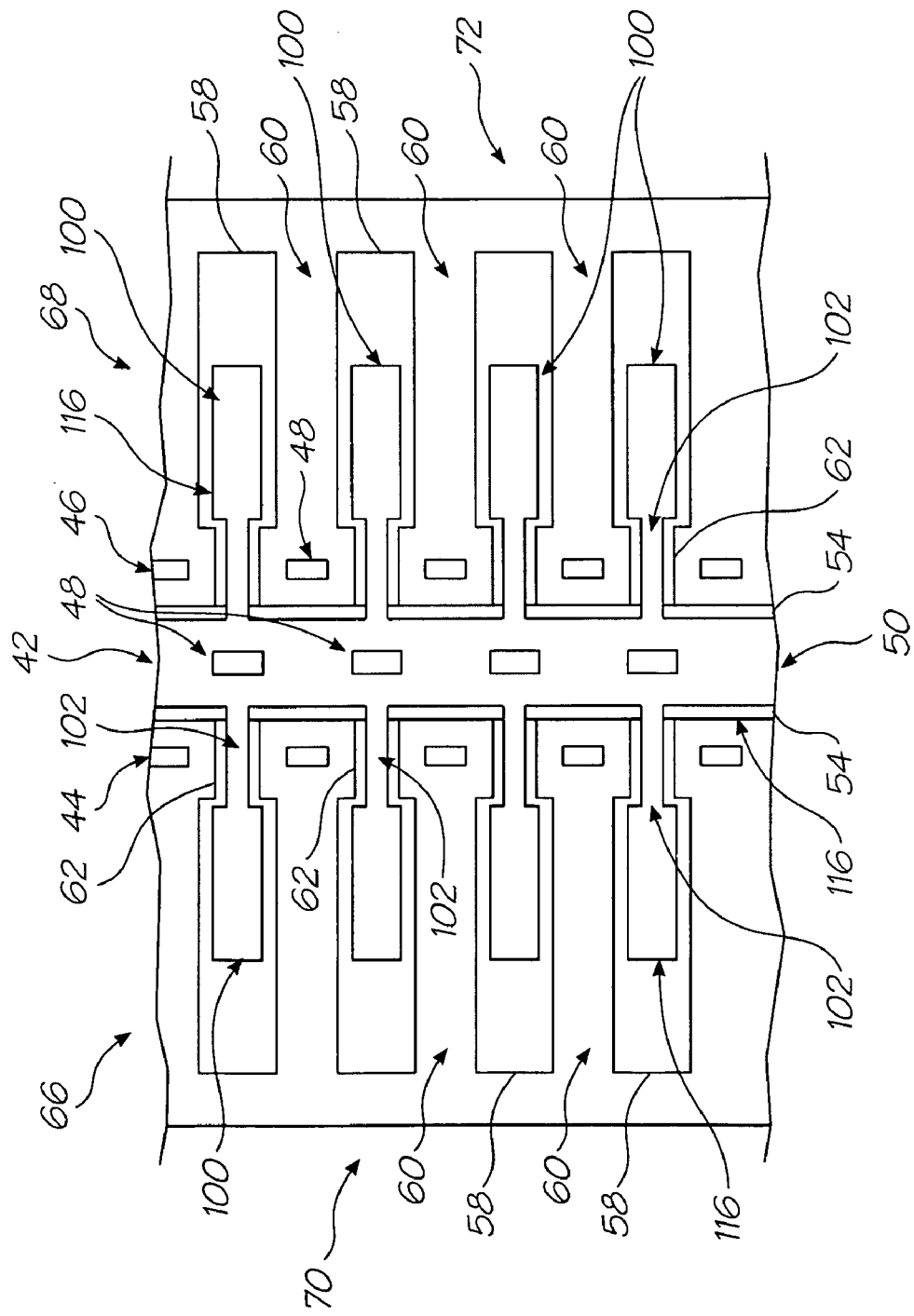
FIG. 9 shows a detailed plan view of part of the ink supply side of the carrier.

The ink supply side 28 of the central portion 24 of the carrier 22 defines a magenta feed channel 50 with the magenta row 42 of ink feed openings 48 defined in the magenta feed channel 50. In particular, a pair of opposed longitudinal walls 54 that extend from the floor 52 defines the magenta feed channel 50. Detail of the magenta feed channel 50 and the walls 54 is shown in FIG. 9.

The printhead side 30 of the central portion 24 defines a pair of ink supply channels 56. The recess 32 is positioned between the ink supply channels 56.

A plurality of laterally extending dividing walls 58 is connected to and extends from each wall 54. The dividing walls 58 are spaced to define a plurality of laterally extending, spaced ink feed channels 60 positioned on each side of the magenta feed channel 50. Each dividing wall 58 has a narrowed portion 62 proximate its respective longitudinal wall 54. Thus, each ink supply channel 60 widens at the longitudinal walls 54.

As can be seen in the drawings, there are two rows 66, 68 of the feed channels 60. Again, for the purposes of illustration and ease of description, the row 66 is referred to as the cyan row while the row 68 is referred to as the yellow row. Thus, in keeping with this terminology, there is provided a discrete cyan feed formation 70 on one side of the magenta feed channel 50 and a discrete yellow feed formation 72 on the other side of the magenta feed channel 50. Each ink feed opening 48 of the cyan row 44 and the yellow row 46 is defined in respective feed channels 60.

The ink distribution assembly 10 includes a cover 78. The cover 78 has a generally T-shaped cross section with a rectangular leg portion 80 and a top portion 82. The leg portion 80 is dimensioned to be received between the opposed side wall portions 26 of the carrier 22. The leg portion 80 has a flat bottom surface 84 which bears against the dividing walls 58 to define a roof for the ink feed channels 60 and the magenta feed channel 50.

Figure 10:
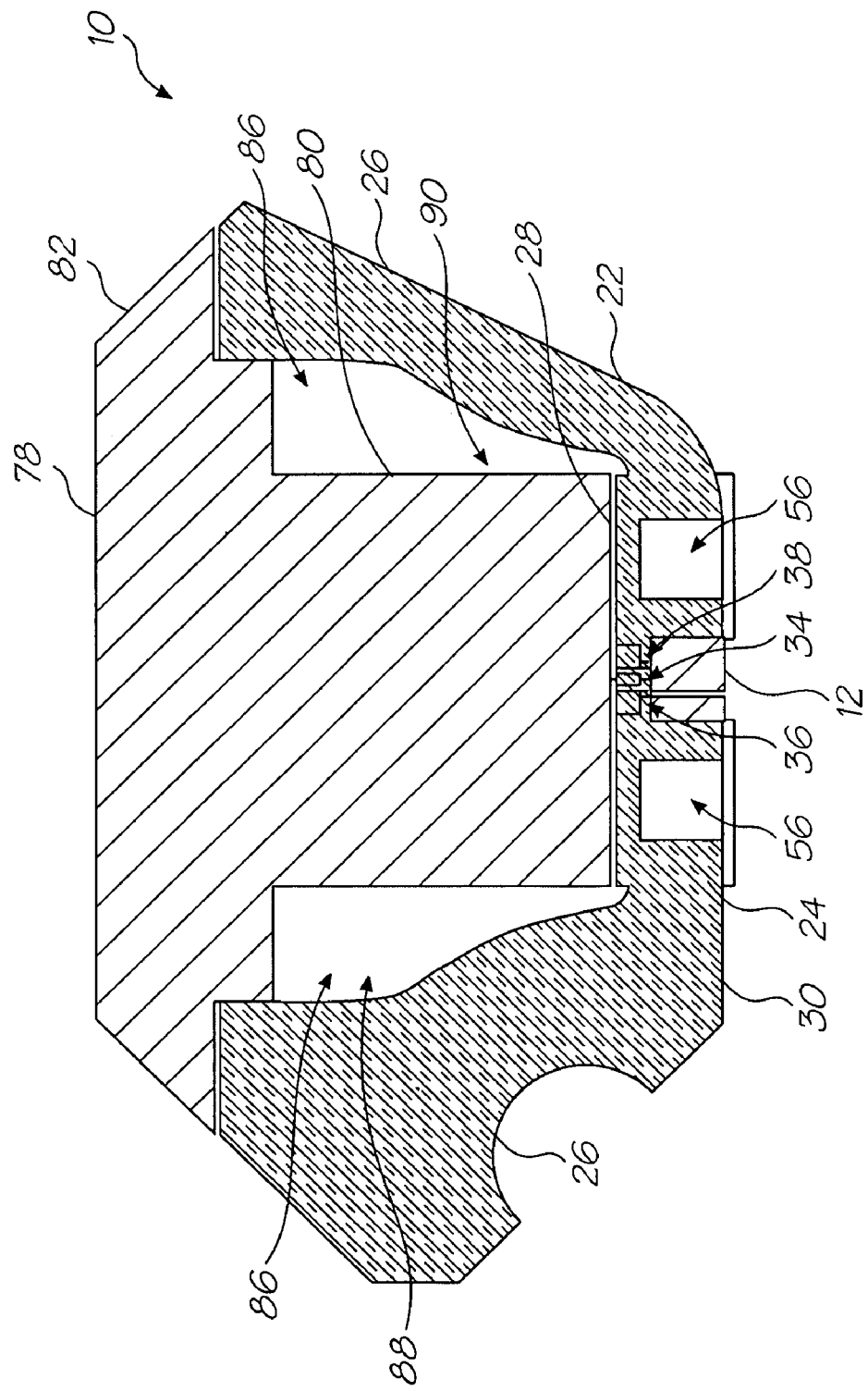
FIG. 10 shows a schematic, cross-sectioned view of the ink distribution assembly.

As can be seen in FIG. 10, when the leg portion 80 is received between the sidewall portions 26, an elongate, longitudinally extending ink pathway 86 is defined between each sidewall portion 26 and the leg portion 80 of the cover 78.

Still further, each dividing wall 58 has a free end that is spaced from its respective sidewall portion 26. It follows that each pathway 86 is in fluid communication with a row 66, 68 of ink feed channels 60. Again, for the purposes of illustration and ease of description, the pathways 86 are referred to as a cyan pathway 88 and a yellow pathway 90. One end 92 of the carrier 22 has three inlet openings defined therein. These are, again for the purposes of convenience, referred to as a central magenta inlet opening 94, a cyan inlet opening 96 and a yellow inlet opening 98.

When the cover 78 is in position, the cyan inlet opening 96 is in fluid communication with the cyan pathway 88. Likewise, in this condition, the yellow inlet opening 98 is in fluid communication with the yellow pathway 90. It will therefore be appreciated that an ink flow path is defined from the openings 96, 98, to the rows 36, 38 of ink inlet openings 18 in the printhead 14 via the pathways 88, 90, the feed channels 60 of the rows 66, 68 and the openings 48 of the rows 44, 46.

Each of the dividing walls 58 has a magenta ink flow passage 100 defined therein, which is in fluid communication with one of the ink supply channels 56. Further, each dividing wall 58 has a magenta conduit 102 defined therein, one end of which is in fluid communication with a respective magenta ink flow passage 100 and the other end of which is in fluid communication with the magenta feed channel 50. It follows that the dividing walls 58 and the longitudinal walls 54 define a magenta feed formation 116.

A pair of magenta ink supply openings 104 is defined in the central portion 24 proximate said one end 92 of the carrier 22. The leg portion 80 is configured so that when the cover 78 is in position, the magenta inlet opening 94 is in fluid communication with both of the magenta ink supply openings 104.

It will therefore be appreciated that an ink flow path is defined between the magenta inlet opening 94 and each of the ink inlet openings 18 in the magenta row 34 of the printhead 14 via the magenta ink supply openings 104, the ink supply channels 56, the magenta ink flow passages 100, the magenta conduits 102, the magenta feed channel 50 and the openings 48 in the magenta row 42.

It will further be appreciated that each of the feed formations 70, 72, 116 defines a pathway that is repeatedly divided into narrower portions as the ink approaches the printhead 12.

The assembly 10 includes a pair of cover plates 106 which are fastenable to the printhead side 30 of the central portion 24 to form roofs for the ink supply channels 56. In FIG. 5, there is shown a printing device that incorporates the assembly 10. The printing device, for example, includes a tape automated bonding (TAB) strip that connects the drive circuitry within the printhead 12 to a control system (not shown) to control operation of the printhead 12. Further, an outer side 108 of each sidewall portion 26 defines guide formations 110 for rollers 112. The rollers 112 are used to drive a print medium 114 past the printhead 12 during printing. Details of the TAB strip and the rollers are set out in the above referenced applications. It follows that these details are not described in this specification.

The carrier 22 is the product of an injection molding process. The carrier 22 can thus be of a thermoplastics material or of a thermosetting material.

In its broadest terms, injection moulding requires the injection of a hot liquid resin or a thermosetting resin into a closed mould, under pressure, until the moulded part is cooled or cured and can be ejected from the mould.

As is known to those of skill in the field of moulding, it is desirable if a component to be moulded can be moulded by a machine requiring only movement to and fro in a single direction. In general, such machines comprise a rear platen, a moving platen and a stationery platen. Dies are positioned between the moving platen and the stationery platen and define, between them, a volume into which pre-molded material is injected.

In the event that a component is required to have an enclosed volume and be injection molded, it is often necessary to provide what are known as side mover cores that operate together with the moulding machinery to generate the component having the included volume. Such side mover cores are known to be extremely expensive and complex both to manufacture and to operate.

In the present invention, it would be intuitive to provide three distinct enclosed volumes, as shown in FIG. 3, for the provision of ink reservoirs from which ink is supplied to each of the rows 34, 36, 38. However, it is clear that an injection-molding machine to generate this form of molding would require side mover cores. This could result in the component being excessively expensive and complicated to manufacture, especially on a mass basis.

The present invention is based on an idea conceived by the Applicant of defining such an enclosed volume or reservoir on the printhead side 30 of the carrier 22. The difficulty with this is to provide an ink flow from the printhead side 30 of the carrier 22 to the ink supply side 28. Applicant has achieved this with the present invention.

It is apparent both from the above description and the drawings that it would be clear to a person of ordinary skill in the field of injection molding that the carrier 22 can be manufactured using a standard injection-molding machine without the requirement for side mover cores.

As is also clear from the drawings, the cover 78 is of a relatively simply shape and can also be manufactured with a standard injection-molding machine.

Applicant believes that the invention provides a means whereby an ink distribution assembly for a page width ink jet printhead can be achieved which lends itself to a simple, one-shot injection molding process. This has far reaching cost implications as printing devices incorporating such ink distribution assemblies are intended for mass manufacture.

We claim:

1. An inkjet printhead assembly comprising:
   a body having:
      a first side having a first channel connected to a first ink supply;
      a second side opposed to the first side, said second side having a second channel connected to a second ink supply;
      a recess separately defined in the second side;
      a plurality of passages defined through the body from the second channel in the second side to the first side; and
      a plurality of ink feed openings defined through the body from the first side to the recess in the second side, a first group of the ink feed openings being individually connected to the first channel, and a second group of the ink feed openings being
      individually connected to the second channel via the passages; and
   a printhead having first and second groups of ink inlets connected to ink ejection nozzles, the printhead being received in the recess so that the first and second groups of ink inlets respectively interface with the first and second third groups of ink feed openings.

2. A printhead assembly according to claim 1, wherein the body is elongate, the first and second channels and the ink feed openings being arranged along the length of the body.

3. A printhead assembly according to claim 2, wherein the first and second groups of ink feed openings are arranged in a row.

4. A printing device comprising the printhead assembly of claim 1.

* * * * *